United States Patent [19]
Perego

[11] Patent Number: 5,125,588
[45] Date of Patent: Jun. 30, 1992

[54] METHOD AND APPARATUS FOR LOCATING A PREDETERMINED POINT ON A CASSETTE TAPE

[75] Inventor: Luciano Perego, Milan, Italy
[73] Assignee: Tapematic U.S.A., Inc., Orlando, Fla.
[21] Appl. No.: 585,606
[22] Filed: Sep. 20, 1990

[30] Foreign Application Priority Data

Aug. 6, 1990 [IT] Italy .................. 21225 A/90

[51] Int. Cl.⁵ ........................... B65H 19/26
[52] U.S. Cl. ........................... 242/56 R; 242/57
[58] Field of Search ............. 242/56 R, 57, 186, 191

[56] References Cited

U.S. PATENT DOCUMENTS

| | | | |
|---|---|---|---|
| 3,627,228 | 12/1971 | Wolfe | 242/57 |
| 3,921,220 | 11/1975 | Primosch | 242/191 X |
| 4,172,231 | 10/1979 | d'Arc | 242/191 X |
| 4,589,608 | 5/1986 | Rehklau et al. | 242/56 R X |
| 4,979,690 | 12/1990 | Kita | 242/56 R X |

Primary Examiner—John M. Jillions
Attorney, Agent, or Firm—Edgar H. Haug; Adam L. Brookman

[57] ABSTRACT

In the described method and apparatus a leader, distributed between two winding hubs of a magnetic tape cassette, is first completely wound onto one hub by means of a first motor. Then, a second motor carries out a complete rewinding of the leader onto the second hub to enable an encoder to execute the counting of the overall length of the leader. Subsequently the first motor is operated again to rewind the leader onto the first hub. The encoder counts how much leader has been rewound on the first hub and causes the stoppage of the rewinding when the length of the rewound leader reaches a predetermined value. The invention arranges a leader so that it may be partly extracted from the cassette and then cut into two equal pieces which will be spliced to the opposite ends of magnetic tape.

7 Claims, 1 Drawing Sheet

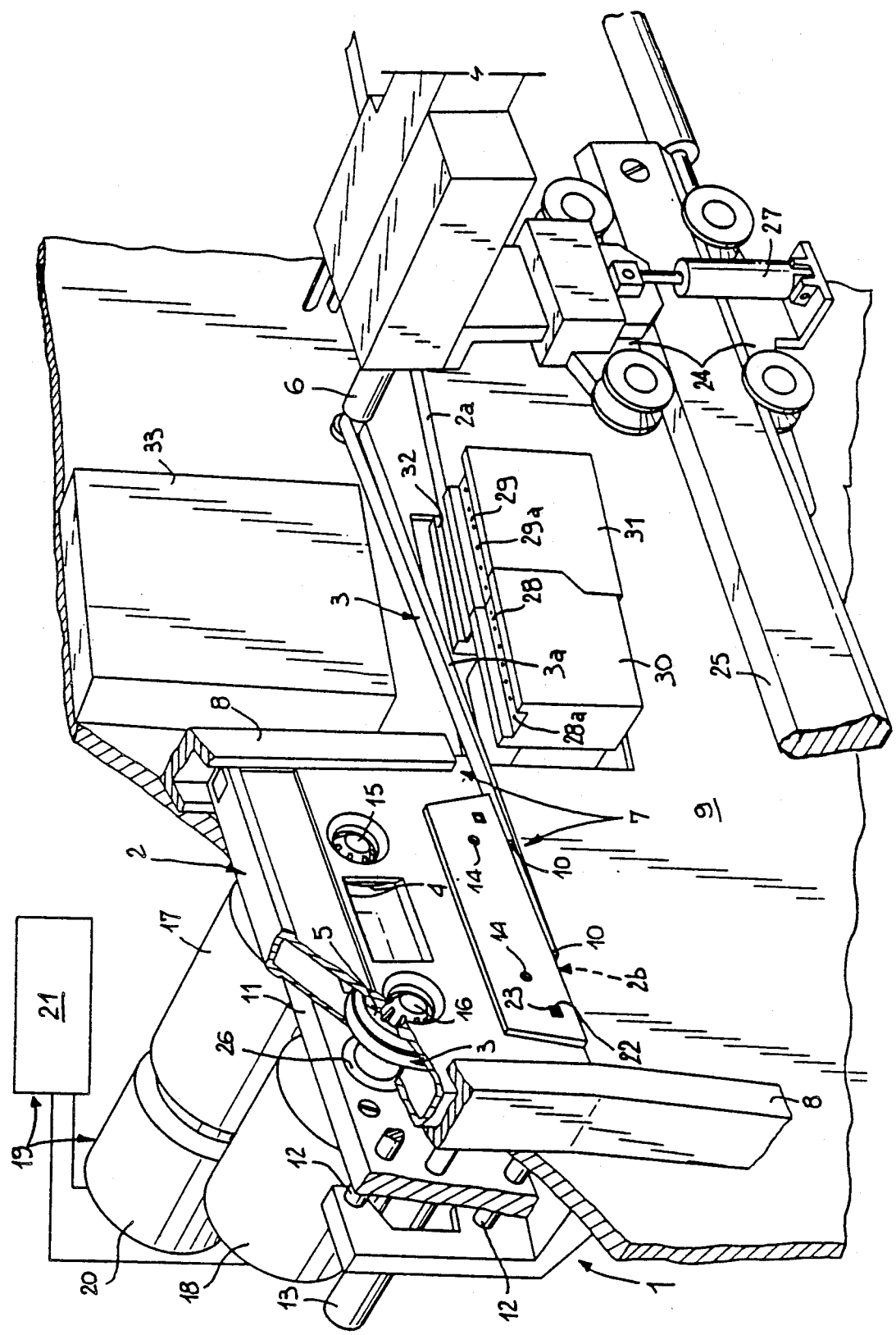

METHOD AND APPARATUS FOR LOCATING A PREDETERMINED POINT ON A CASSETTE TAPE

BACKGROUND OF THE INVENTION

The invention applies to automatic machines for loading magnetic tape into tape cassettes and more particularly to a method and apparatus for locating a predetermined point on a leader tape of a tape cassette.

PRIOR ART

The loading of magnetic tape into tape cassettes, such as audio or video cassettes, is generally carried out on automatic loading machines. The empty cassettes coming to the loading machine have a pair of hubs inside the cassette housing. The ends of a variable length (depending on the manufacturer) "leader" are secured to each of the hubs. The leader may be either completely wound around one of the hubs or partly distributed between the two hubs in an undetermined manner.

In a typical prior art process, the loading of the tape into the cassette is carried out close to a loading station provided in a tape loading machine. In this loading station the leader is cut into two pieces, preferably of the same length, which are then spliced to the opposite ends of the magnetic tape.

Once the engagement of the cassette in the loading station has occurred, the leader is completely extracted from the cassette by the action of a grasping member mounted on a movable carriage. The leader, which is extracted from the cassette and engaged at its ends to the cassette hubs, is subsequently cut in register with its longitudinal center line by a cutter mechanism. Afterwards, a splicing mechanism is operated Which splices one end of the magnetic tape to one end of the cut leader tape.

At this point, a winding spindle, operated by an electric motor, rotates the hub carrying the leader part to which the magnetic tape has been connected. In this manner a predetermined length of the magnetic tape carried on a supply reel or "pancake" is wound onto the hub. When the desired length of magnetic tape has been wound onto the hub, the tape is cut and spliced to the other piece of the leader engaged on the other cassette hub.

As the winding spindle is rotated again, the tape and the leader completely enter the cassette. The cassette is then ejected from the loading station.

It should be understood that the carriage carrying the grasping element must carry out a rectilinear stroke of a length equal to at least half the overall length of the leader, in order to perform its function in a proper manner. This requirement has prevented the reduction of the width of tape loading machines.

It is to be noted that the same Applicant has recently developed a new automated tape loading center having a plurality of loading modules which execute the tape loading into the cassettes by operating independently of one another. In this machine, which has been the subject matter of patent applications filed on the same date in the name of the same Applicant including U.S. application Ser. No. 07/585,395, entitled Tape Loading Center which is incorporated herein by reference, it is of great importance, for reduced bulkiness, that each loading module have a very reduced width, much lower than that of currently used loading machines. If it were necessary to completely extract the leader from the cassette to find its center line, as in the prior art, such a machine would be virtually impossible to develop.

Still further, with prior art devices, the longer the leader is, the more the point at which the leader is cut moves away from the center line. This is a negative factor for the loading operation as well as the consumer who finds it aesthetically unsatisfactory.

SUMMARY OF THE INVENTION

The main object of the present invention is to substantially solve the above problems by providing a method and an apparatus adapted to suitably arrange the leader tape within the cassette so that it may be cut exactly in register with its longitudinal center line after only a short length has been extracted from the cassette. That length should be just sufficient to bring the leader tape close to the cutter and splicing mechanism so that the leader is cut and then spliced to the magnetic tape.

A further object of the present invention is to insure that the cutting of the leader may occur at the longitudinal center line independently of the length of the leader and of how the leader is distributed between the two cassette hubs.

Another object of the present invention is to provide an apparatus which is adapted to interact with the loading machine, without structural complications.

The foregoing and further objects will become more apparent in the course of the present description.

BRIEF DESCRIPTION OF THE DRAWINGS

In the drawings:

FIG. 1 is a partially broken away perspective view of an apparatus in accordance with the present invention associated with a loading module provided a tape loading center, in which a grasping element associated with the module has partly pulled the leader from the cassette.

DESCRIPTION OF THE PREFERRED EMBODIMENT

Referring to FIG. 1, the apparatus for locating a predetermined point on the length of a leader associated with a magnetic tape cassette is generally identified by reference numeral 1.

Apparatus 1 is adapted to operate on a common tape cassette 2. The cassette has, between its two hubs 4 and 5, a leader 3. The opposite ends of leader 3 are respectively secured to hubs 4 and 5.

Apparatus 1 enables a predetermined point on the length of the leader 3 to be disposed so that it faces the front opening 2b of the cassette 2, which will enable the leader itself to be engaged, at a predetermined point on its length, by an extraction pin 6 associated with an automatic machine for tape cassette loading 9.

In the embodiment shown, the apparatus 1 is directly mounted on such a loading module which is associated with the Tape Loading Center, the application for which has been previously incorporated by reference which is only partly shown and not further described as it is not of major importance to the understanding of the operation and function of the present invention.

It should be noted that the apparatus 1 in question, may act as a separate unit independently from the loading machine 9.

The apparatus 1 is capable of locating a predetermined point on the length of the leader 3 by adopting a process comprising the steps of: completely winding the leader onto the first cassette hub 4, completely rewinding the leader onto the second cassette hub 5 while simultaneously counting the leader 3 length, rewinding the leader 3 onto the first hub 9 while simultaneously counting the length of the rewound leader 3 and, interrupting the rewinding when a predetermined length of the leader 3 has been rewound onto the first hub 4.

Apparatus 1 comprises positioning means generally identified at 7, to hold the cassette 1 in a predetermined position. In the embodiment shown, the positioning means 7 comprises a pair of feed guides 8 fastened to a front wall 9 of the loading module (or machine) and slidably engaging the cassette 2 at the opposite sides thereof. Associated with the feed guides 8 is one or more movable stop pegs 10 driven by one or more fluid-operated cylinders (not shown). The pegs 10 move from a rest position, in which they are disposed flush with the machine's wall 9, to a working position, in which, as shown in FIG. 1, they protrude from the wall 9 so as to stop the cassette's fall along the feed guides 8. The positioning means 7 further comprises a pair of centering points (not shown) fastened to a plate 11 which is slidably mounted on slides 12 secured at the rear to the wall 9. The plate 11 is movable, upon command of one or more fluid-operated actuators 13, from a rest position in which it is located backward relative to the front wall 9, to a working position in which, as shown in FIG. 1, it is located close to the front wall 9 so that the centering points engage locating holes 14 conventionally provided in the cassette 2.

Also mounted on plate 11 are first and second winding spindles 15 and 16 which, when the plate 11 is in its working position, engage the first and second hubs 4 and 5 of the cassette 2. The first winding spindle 15 rotates upon command of motor 17 which is fastened to the plate 11 so as to cause the winding of the leader 3 onto the first hub 4.

The second spindle 16, in turn, rotates upon command of a second motor 18, in the opposite way relative to the rotation of the first winding spindle 15, so as to cause the winding of the leader 3 onto the second hub 5.

Counting means 19 is operatively connected to the winding spindles 15 and I for counting the leader length when the leader 3, after being completely wound onto the first hub 4 upon command of the first winding spindle 15, is completely rewound onto the second hub 5 upon command of the second winding spindle 16. The counting means 19 is also arranged so as to control the stoppage of the first winding spindle 15 when a predetermined amount of leader 3 has been rewound onto the first hub 4.

Preferably, the counting means 19 substantially comprises a common encoder 20 operatively connected to the first motor 17 and linked to an electronic control box 21 (not described in detail as it is not important to the ends of the invention) which controls the starting and stopping of both motors 17 and 18.

In operation the cassette 2 is engaged along the feed guides 8 until it meets the stop pegs 10, which are at their working position. At this point the plate 11, which is initially in the rest position, is brought to the working position upon command of the fluid-operated actuator 12. Thus the final positioning of the cassette 2 is achieved by means of the centering points fastened to the plate 11 which engage the locating holes 14. Simultaneously, the winding spindles 15 and 16 operatively engage hubs 4 and 5, respectively.

At this point, the cassette is properly positioned and has the leader 3 partially wound on each of the two hubs 4 and 5, the wound length on each hub being undetermined.

Next, the electronic control box 21 activates the motor 17 to cause the winding of all of the leader 3 onto the first hub 4, through the first winding spindle 15.

When the leader 3 has been completely wound onto the first hub 4, the winding spindles 15 and 16 are prevented from rotating, so that an increase in current absorption by the first motor 17 occurs. The control box 21 detects the variation in the current absorption by motor 17 and causes its deactivation. Simultaneously, control box 21 activates the second motor 18.

The operation of the second winding spindle 16 causes the complete rewinding of the leader 3 onto the second hub 5 and the simultaneous driving of the first winding spindle 15 together with the rotor of the first motor 17. During this step the encoder 20 and the control box 21 carry out the counting of the leader length until, the winding spindles 15 and 16 are again prevented from rotating.

At this point, the control box 21 causes the stoppage of the motor 18 and the simultaneous operation of the motor 17, while controlling, through the encoder 20, the length of the leader 3 which is being rewound onto the first hub 4.

The control box 21 also calculates, based on the length value detected during the operation of the motor 18, how long the length of the leader 3 to be rewound onto the first hub 4 must be before causing the stoppage of the motor 17. In the embodiment shown, this length is determined by dividing the value of the overall leader length by two and adding a predetermined amount to the result thus obtained, the value of which amount depends on the relative positioning between the means carrying out the leader cutting (not shown), the cassette 2 and the pin 6 at its farthest position from the cassette 2.

At the end of the partial winding of the leader 3 onto the first hub 4, a short portion of the leader itself is extracted from the front opening 2b of the cassette 2, upon the action of a blowing nozzle 22 carried by the plate 11 and operating through another hole 23 conventionally present in the cassette 2. (This extraction could also be carried out using a movable suction device rather than a blowing nozzle).

The short portion of leader 3 coming out of the opening 2b forms a loop which is entered transversely by the pin 6 as a result of an axial displacement of the pin 6 controlled by an actuator. The pin 6, mounted on a carriage 24 movable along a slide 25, is moved sideways relative to the cassette thereby causing a further pulling of the leader 3 out of the cassette but, involving only a short portion of the total length thereof. During this step one of the winding spindles 15 or 16 is prevented from rotating by an electromechanical clutch 26 so as to be sure that the amount of leader 3 extracted from the cassette 2 is taken from only one of the hubs 4 or 5. In the example shown, the electromechanical clutch 26 is associated with the second winding spindle 16. Alternatively, the motor 17 or 18 could be provided with an electromagnetic brake or other braking means.

Once the leader extraction has been completed, the pin 6 is lowered upon command of a further fluid-operated actuator 27, so that one portion 3a of the leader 3 (the bottom portion), is laid into two rectilinear tracks 28, 29 formed on first and second support blocks 30 and 31 respectively, which are disposed in mutual alignment. The portion 3a of the leader 3 which is held in the tracks 29, 30 by a suction action produced through holes 28a, 29a opening into the track bottoms is subsequently cut by a cutter mechanism (not shown), which is transversely movable between the blocks.

At this point, the second block 31 is shifted relative to the first block 30 in order to bring a feed track 32 carried by the second block and designed to guide the tape 2a to be loaded into the cassette 2, into alignment with the track 28 of the first block 30. Then both blocks 30 and 31 are simultaneously moved backward, towards the front wall 9, to enable the execution of the splicing between the tape 2a and the leader portion 3a carried by the first block 28, upon the action of a splicing unit 33.

After the splicing operation, the blocks 30 and 31 are again moved away from the front wall 9 and the second motor 18 is operated again in order to start the winding of the tape 2a onto the second hub 5 of the cassette 2.

When a predetermined amount of the tape 2a, continuously supplied by a supply reel (not shown), has been wound into a cassette, the second motor 18 is deactivated and the cutter mechanism cuts the tape 2a. Then the second block 31 is moved so that it brings track 29, still engaging the leader end portion 3a connected to the first hub 4, into alignment with the track 28 of the first block 30.

The blocks 30 and 31 are simultaneously moved backward towards the front wall 9 to enable the splicing unit 33 to join the magnetic tape end 2a to the corresponding end of the leader portion 3a. At this point, by a new operation of the second motor 18 the winding of the magnetic tape and the corresponding leader 3 stops.

The plate 11, which carries winding spindles 15 and 16, is brought back to its rest position and the stop pegs 10 are moved backward into the front wall 9 so that the cassette 2 can be ejected along the feed guides 8.

By virtue of the method and apparatus of the present invention it is not necessary to completely extract the leader 3 from the cassette 2 to find the center line in the longitudinal extension of the leader, as in the prior art. Because a predetermined amount of the leader 3 is wound onto each hub 4 and 5, it is possible to greatly reduce the stroke of the pin 6 while still enabling the leader to be engaged on the blocks 30 and 31.

The reduction of the pin 6 stroke can result in an important reduction in the width of the loading machine, or of the individual loading modules associated with a completely automated loading center.

The apparatus and method in question can also be installed and exploited as a separate unit operating independently of a loading machine.

Although the present invention has been described with reference to a specific embodiment, neither the exact described operation, nor the specific structure mentioned should be construed as limiting since the disclosed embodiment is merely illustrative of the invention. One of skill in the art may alter the described embodiment without departing from the spirit or scope of the invention.

What is claimed is:

1. A method for locating a selected point on a length of a leader tape partially wound on each of the two hubs of a cassette, comprising the following steps:
    completely winding the leader tape onto the first cassette hub;
    completely rewinding the leader tape onto the second cassette hub while simultaneously counting the leader tape length;
    rewinding the leader tape onto the first hub while simultaneously counting the length of the rewound leader tape; and
    interrupting the rewinding when a predetermined ratio is achieved between the length of leader tape on the first hub and the length of leader tape on the second hub.

2. The method of claim 1 further comprising:
    automatically stopping the rotation of one of the winding spindles;
    automatically extracting the leader tape from the cassette; and
    automatically cutting the tape at a predetermined point in accordance with the predetermined ratio.

3. An apparatus for locating a predetermined point on a length of leader tape wound on each of two hubs of a cassette, comprising:
    positioning means for holding a cassette in a predetermined position;
    a first winding spindle capable of operatively engaging the first cassette hub;
    a second winding spindle capable of operatively engaging the second cassette hub; and counting means operatively connected to said first and second winding spindles to count the length of a leader tape secured between the first and second cassette hubs, when the leader tape, after being completely wound onto the first hub by said first winding spindle, is rewound onto the second hub by said second winding spindle, wherein said counting means further causes the stoppage of said first winding spindle when a predetermined amount of the leader tape has been rewound onto the first hub.

4. The apparatus as claimed in claim 3, wherein said positioning means comprises:
    a pair of substantially upright feed guides fastened to a support wall; and at least one stop peg movable from a rest position in which it is disposed flush with said support wall to a working position in which it is capable of intercepting the descent of the cassette along said feed guides.

5. The apparatus as claimed in claim 3, further comprising a plate slidably mounted behind said support wall, carrying said first and second winding spindles and movable from a rest position in which it is away from said wall to a working position in which it is located close to said wall and said first and second winding spindles are operatively engaged in the hubs.

6. The apparatus as claimed in claim 3, wherein said first winding spindle is rotated by a first motor and said second winding spindle is rotated by a second motor.

7. The apparatus as claimed in claim 6, wherein said counting means comprises:
    an encoder operatively connected to either of said first or second motors; and electronic control means connected to said encoder and said first and second motor to control the operation of said first and second motors based on data detected by the encoder.

* * * * *